(12) United States Patent
Inagaki et al.

(10) Patent No.: US 7,081,510 B2
(45) Date of Patent: Jul. 25, 2006

(54) SHELL MATERIAL FOR RECORDING MEDIA

(75) Inventors: Yasuhito Inagaki, Kanagawa (JP); Masahiro Sawaguchi, Miyagi (JP); Daisuke Hasegawa, Miyagi (JP); Tadanori Kawamura, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/796,219

(22) Filed: Mar. 9, 2004

(65) Prior Publication Data

US 2004/0220338 A1    Nov. 4, 2004

(30) Foreign Application Priority Data

Mar. 12, 2003 (JP) .......................... P2003-066206
Mar. 12, 2003 (JP) .......................... P2003-066207

(51) Int. Cl.
*C08G 63/02* (2006.01)

(52) U.S. Cl. .................. 528/272; 359/109; 369/47; 369/59.11; 369/59.24; 428/64.1; 521/48; 528/190; 528/193; 528/271

(58) Field of Classification Search ................ 359/109; 369/47, 59.11, 59.24; 428/64.1; 521/48; 528/190, 193, 271, 272
See application file for complete search history.

(56) References Cited

U.S. PATENT DOCUMENTS

| | | | |
|---|---|---|---|
| 5,859,071 A * | 1/1999 | Young et al. ............... | 521/40.5 |
| 6,251,509 B1 * | 6/2001 | Kawamata et al. .......... | 428/216 |
| 6,767,610 B1 * | 7/2004 | Takahashi et al. .......... | 428/141 |
| 2003/0031884 A1 * | 2/2003 | Honda et al. .............. | 428/469 |
| 2004/0137321 A1 * | 7/2004 | Savaria et al. ............. | 429/176 |
| 2004/0161690 A1 * | 8/2004 | Sakurai et al. ............. | 430/124 |

FOREIGN PATENT DOCUMENTS

JP        2002-292628        10/2002

* cited by examiner

*Primary Examiner*—Terressa Boykin
(74) *Attorney, Agent, or Firm*—Sonnenschein Nath & Rosenthal LLP

(57) ABSTRACT

The invention provides a shell material for recording media comprising an alloy between an acrylonitrile-butadiene-styrene resin and recovery polyethylene terephthalate, the content of recovery polyethylene terephthalate in the total amount of the alloy being in the range of 5 to 80% by mass.

The invention also provides a shell material for recording media comprising an alloy between an acrylonitrile-butadiene-styrene resin and recovery polyethylene terephthalate and having a window part. The content of recovery polyethylene terephthalate in the total amount of the alloy is in the range of 5 to 80% by mass, and the window part comprises the polyethylene terephthalate resin, a polycarbonate resin or a polyphenylene ether resin as a constituting material.

28 Claims, 2 Drawing Sheets

*Fig. 1*

| SAMPLE No. | FALL-DOWN TEST | PLANARITY | DIMENSIONAL ACCURACY AFTER MOLDING | DIMENSIONAL CHANGE AFTER HEATING | FUSION STRENGTH OF WINDOW |
|---|---|---|---|---|---|
| 1 | OK | OK | OK | ○ | — |
| 2 | OK | OK | OK | ○ | OK |
| 3 | OK | OK | OK | ○ | OK |
| 4 | OK | OK | OK | ◎ | OK |
| 5 | OK | OK | OK | ◎ | OK |
| 6 | OK | OK | OUT-OF-SPECIFICATION AT SOMEWHERE | ◎ | OK |
| 7 | OK | OK | OK | ○ | OK |

Fig. 2

| SAMPLE No. | FALL-DOWN TEST | PLANARITY | DIMENSIONAL ACCURACY AFTER MOLDING | DIMENSIONAL CHANGE AFTER HEATING | FUSION STRENGTH OF WINDOW |
|---|---|---|---|---|---|
| 1 | OK | OK | OK | ○ | — |
| 2 | OK | OK | OK | ○ | OK |
| 3 | OK | OK | OK | ○ | OK |
| 4 | OK | OK | OK | ◎ | OK |
| 5 | OK | OK | OK | ◎ | OK |
| 6 | OK | OK | — | ◎ | — |
| 7 | OK | OK | OK | ○ | OK |
| 8 | OK | OK | OK | ○ | OK |
| 9 | OK | OK | OK | ◎ | OK |
| 10 | OK | OK | OK | ◎ | OK |
| 11 | OK | OK | OK | ◎ | — |
| 12 | OK | OK | — | ○ | OK |
| 13 | OK | OK | OK | ○ | OK |
| 14 | OK | OK | OK | ○ | OK |
| 15 | OK | OK | OK | ◎ | OK |
| 16 | OK | OK | OK | ◎ | OK |
| 17 | OK | OK | OK | ◎ | OK |
| 18 | OK | OK | — | ◎ | OK |
| 19 | OK | OK | OK | ○ | OK |

SHELL MATERIAL FOR RECORDING MEDIA

RELATED APPLICATION DATA

The present application claims priority to Japanese Application(s) No(s). P2003-066207 filed Mar. 12, 2003, and P2003-066206 filed Mar. 12, 2003, which application(s) is/are incorporated herein by reference to the extent permitted by law.

BACKGROUND OF THE INVENTION

1. Field of the Invention

The invention relates to a shell material for recording media using used PET wastes as starting materials.

2. Description of the Related Art

Polyethylene terephthalate (PET) bottles are manufactured by molding a polyethylene terephthalate resin as a kind of plastics. Since such bottle are lightweight, resistant to impact, transparent and sanitary good, they have been rapidly spread as beverage bottles, and consumption of PET bottles is increasing year by year. Such PET bottles are usually discarded after use. The amount of the waste PET bottle is also increasing every year, and causes environmental problems such as disposal of the waste.

Recovery of used PET bottles has been attempted in recent years as an effort for protecting the environment, and recycling of the used PET bottles as reclaimed resources is in operation. For example, the PET bottle is recovered from general household as reusable wastes, or classified and recovered in an exclusive use recycling box placed in supermarkets and convenience stores. The used PET bottle recovered is transported to recycle centers in municipalities thereafter, and other plastic products such as polyvinyl chloride bottles are excluded or the PET bottle is compressed for recycling the PET bottle. The compresses PET bottle is pulverized by recycling traders into flakes for producing recycled commodities. The recycled PET flakes are usually reused as materials of fabrics (such as working clothes, shirts and curtains), plastic sheets, bottles (for non-food) or various molded products. However, countermeasures for surplus of recycled PET has became a large social problem today since the amount of the recycled PET exceeds the demand of the regenerated PET. Under these situations, while an alloy between polyacrylonitrile-butadiene-styrene copolymer and recycled polyethylene terephthalate (ABS/recovery PET alloy) is proposed as one of the effective use of recycled PET (Japanese Patent Laid-Open (JP-A) No. 2002-292628), practical application field that is able to completely solve the problem of surplus has not been found yet, and developments of practical uses of recycled PET have been urgently desired.

OBJECTS AND SUMMARY OF THE INVENTION

Under the situations as described above, developments of novel application fields of the ABS/recovery PET alloy is urgently desired for accelerating recycled use of recovery PET obtained by withdrawing used PET. The problem of surplus of recovery PET may be solved by developing novel uses of the ABS/recovery PET alloy.

The object of the invention is to provide a shell material for recording media as a novel use of the ABS/recovery PET alloy.

The inventors of the invention have found that, through intensive studies for solving the problems above, the ABS/recovery PET alloy containing a given proportion of recovery PET can be used as a constituting material of the shell material for recording media, and that the proportion of recovery PET contained in the alloy is preferably in the range of 5 to 80% by mass relative to the total amount of the alloy. In addition, the inventors have found that the shell material for recording media greatly contribute to recycling of recovery PET, and is useful as a countermeasure against surplus of recovery PET.

The inventors of the invention also found that kneading with heating the ABS/recovery PET alloy containing 5 to 80% by mass of reclaimed polyethylene terephthalate is advantageous for industrial production of the shell material for recording media.

The inventors of the invention further found that the shell material for recording media comprising the ABS/recovery PET alloy and having an window part is able to largely contribute to recycling of recovery PET and is useful for countermeasures to surplus of recovery PET, wherein the content of recovery PET in the total amount of the alloy is in the range of 5 to 80% by mass, and the window part comprises the PET resin, polycarbonate resin or polyphenylene ether resin as a constituting material.

The inventors of the invention further found that it is industrially advantageous to produce the shell material for recording media by two-color molding of the ABS/recovery PET alloy containing 5 to 80% by mass of recovery PET, and the PET resin, polycarbonate resin or polyphenylene ether resin.

The invention has been completed through additional investigations after obtaining various discoveries as described above.

The invention provides a shell material for recording media comprising an ABS/recovery PET alloy. the content of recovery PET in the total amount of the alloy is in the range of 5 to 80% by mass.

The invention also provides a method for producing a shell material for recording media comprising the step of kneading with heating an ABS/recovery PET alloy containing 5 to 80% by mass of recovery PET.

The invention further provides a method for producing a shell material for recording media comprising the step of two-color molding of the ABS/recovery PET alloy containing 5 to 80% by mass of recovery PET, and a polyacrylonitrile-styrene copolymer resin.

The invention further provides a method for recycling recovery PET using recovery PET for producing an ABS/recovery PET alloy containing 5 to 80% by mass of recovery PET used as a starting material of a shell material for recording media.

The invention further provides a recording media comprising a shell material for recording media comprising an ABS/recovery PET alloy, the content of recovery PET in the total amount of the alloy is in the range of 5 to 80% by mass.

The invention further provides electronic and electric appliances mounting a recording media comprising a shell material for recording media comprising an ABS/recovery PET alloy. The content of recovery PET in the total amount of the alloy is in the range of 5 to 80% by mass.

The invention further provides a shell material for recording media comprising an ABS/recovery PET alloy and having an window part part. The content of recovery PET in the total amount of the alloy is in the range of 5 to 80% by mass, and the window part comprises a polyethylene terephthalate resin, a polycarbonate resin or a polyphenylene ether resin as a constituting material.

The invention further provides a method for producing a shell material for recording media comprising the step of two-color molding of an ABS/recovery PET alloy containing 5 to 80% by mass of recovery PET, and a polyethylene terephthalate resin, polycarbonate resin or polyphenylene ether resin.

The invention further provides a method for recycling recovery PET using recovery PET for producing a shell material for recording media comprising an ABS/recovery PET alloy and having an window part comprising the polyethylene terephthalate resin, a polycarbonate resin or a polyphenylene ether resin as a constituting material.

The invention further provides recording media containing a shell material for recording media comprising an ABS/recovery PET alloy and having an window part. The content of recovery PET in the total amount of the alloy is in the range of 5 to 80% by mass, and the window part comprises the polyethylene terephthalate resin, a polycarbonate resin or polyphenylene resin as a constituting material.

The invention further provides electronic and electric appliances mounting recording media containing a shell material for recording media comprising an ABS/recovery PET alloy having an window part. The content of recovery PET in the total amount of the alloy is in the rage of 5 to 80% by mass, and the window part comprises the polyethylene terephthalate resin, a polycarbonate resin or a polyphenylene resin as a constituting material.

BRIEF DESCRIPTION OF THE DRAWINGS

FIG. 1 shows the results of fall down tests and evaluation of flatness of the shell material for recording media in the first embodiment.

FIG. 2 shows the results of fall down tests and evaluation of flatness of the shell material for recording media in the second embodiment.

DETAILED DESCRIPTION OF THE PREFERRED EMBODIMENT

The first embodiment of the invention will be described in detail hereinafter.

The invention provides a shell material for recording media comprising an ABS/recovery PET alloy containing 5 to 80% by mass of recovery PET in the total amount of the alloy. In the invention, the combined content of the content of the acrylonitrile-butadiene-styrene resin and the content of recovery PET in the shell material is preferably in the range of 5 to 98% by mass, more preferably 10 to 90% by mass in the total amount of the sell material.

The ABS/recovery PET alloy is a mixture of the ABS resin and recovery PET, and any alloys are available so long as the content of recovery PET is in the range of 5 to 80% by mass in the total amount of the alloy. The alloy include the mixture above as well as a copolymer of the ABS resin and recovery PET or a modified copolymer thereof.

Any ABS resins are available so long as the resin contains a copolymer of butadiene and styrene, and ABS resin known in the art are also available. The resin may be a resin containing a copolymer of acrylonitrile, butadiene and styrene, and monomers other than these monomers (for example methyl methacrylate or ethyl methacrylate). The copolymer may be either a graft copolymer or a random copolymer. Otherwise the copolymer may be either an alternate copolymer or a block copolymer. The composition ratio of the copolymer in the ABS resin above may be arbitrarily determined.

The ABS resin may be a commercially available virgin resin, or a waste material. Or, the resin may be a recycled waste material.

The virgin resin is appropriately selected from the commercially available virgin resin of various grades considering, for example, wide applicability, good fluidity, high rigidity, high impact resistance, high slidability, heat resistance, transparency, high luster, fire retarding property, platability, reinforcing effect with glass fibers, weather resistance, voltage resistance, scratch resistance, softness, alloy forming ability, chemical resistance, painting and the like. According to the invention, the virgin resin may be a mixture or copolymer of a resin other than the ABS resin such as polycarbonate (PC), polyethylene terephthalate (PET) or polyolefin (for example polyethylene or polypropylene), and the ABS resin. The virgin resin may be manufactured by a method known in the art such as a polymer blend kneading method, polymer blend latex mixing method, emulsion graft method, mass polymerization method or mass suspension polymerization method. The virgin resin may contain various resin additives, and examples of the additives include an antistatic agent, a coloring agent or pigment, an antioxidant, a fire retardant, a plasticizer, a light resistance accelerating agent, a compatibilizer, a surface treating agent, a reforming agent, a coloring agent (for example carbon black), glass fibers, paper, nonwoven fabric and the like.

Any waste materials containing the ABS resin may be available so long as they can be used for producing the ABS/recovery PET alloy. While examples of the waste material include those containing the ABS resin used in electric appliances, office devices, vehicles and commodities such as groceries, those containing the ABS resin and released from factories as runner materials and tips of pellet materials, or mixtures of these waste materials, the waste materials are preferably those containing the ABS resin released from the factories as the runner materials and tips of pellet materials. The waste material is preferably used in the same commodity or a commodity belonging to the same commodity group, more preferably used in a standardized commodity for obtaining more uniform quality of the waste material, in the invention. The standardized commodities as described above include those related to recording media, for example professional use video cassettes and consumer use 8 mm video cassettes, DV cassettes, home video game players (for example main units and controllers), and portable phones. Any conditions of the waste materials are acceptable, for example a released state itself or after applying mechanical processing such as pulverization or compression.

The waste material may contain additives other than the ABS resin, for example resins other than the ABS resin, and resin additives such as antistatic agent, coloring agent or pigment, antioxidant, fire retardant, plasticizer, light resistance accelerating agent, compatibilizer, reforming agent or coloring agent (such as carbon black), glass fiber, paper and nonwoven fabric.

The resins other than the ABS resin are natural resins and synthetic resins other than the ABS resin, which include heat curable resins and thermoplastic resins. The resin other than the ABS resin is preferably an acrylonitrile-styrene (AS) copolymer since it is compatible with the ABS resin.

Any recycled resins are acceptable so long as they are obtained by recycling the waste material, and may be produced by a recycling treatment such as blending (a) the waste material with (b) an ABS resin being in a different grade from the waste material. Methods known in the art may be used for blending. Examples of the production method include the steps of mixing with heating (a) the waste material and (b) the ABS resin being in a different grade from (a) the waste material until the mixture is melted, and cooling the mixed resin; and mixing by dissolving (a) the waste material and (b) the ABS resin being in a different grade from (a) the waste material with a solvent, and removing the solvent by a method known in the art such as drying. Examples of the solvent include organic solvents (for example acetone, methylethyl ketone, toluene, xylene, methylisobutyl ketone, ethyl acetate, ethyleneglycol monomethylether, N,N-dimethylformamide, N,N-dimethylacetamide, methanol, ethanol, methyl cellosolve, methyl pyrrolidone, chloroform, cyclohexanone and the like), inorganic solvents (such as sulfuric acid, nitric acid and hydrochloric acid), and mixed solvents thereof. The solvents may be appropriately selected depending on the waste material and ABS resin described in (b).

Any ABS resins described in (b) may be accepted so long as they are the ABS resin in a different grade from the waste material (a). The virgin resin and waste material may be accepted, and may be a special grade ABS resin that can be manufactured in the factory as a non-sales product. The resin described in (b) may be a single grade ABS resin, pr a mixed resin prepared by blending at least two grade of the ABS resins. The ABS resin described in (b) is preferably a general use grade ABS resin. Otherwise, the ABS resin described in (b) is preferably an ABS resin having a higher impact resistance grade than the waste material. Using the ABS resin having a higher impact resistance grade than the waste material for recycling as the ABS resin described in (b) permits the waste material to be recycled as a resin having a quality as high as the quality level of the virgin resin, even when a small amount of the ABS resin described in (b) is added in the waste material. The kind of the ABS resin describes in (b) may be appropriately selected depending on, for example, the impact resistance of the waste material (a). The impact resistance may be a level commonly accepted. While the impact resistance of the waste material is usually lower than the impact resistance of the virgin resin, the impact resistance of the former may be higher than that of the latter, and is not particularly restricted in the invention.

It is preferable in the invention for restoring the quality of the waste material that the amount of addition of the ABS resin described in (b) is about 1% by mass or more, more preferably in the range of 1 to 99% by mass, relative to the combined mass of the mass of the waste material described in (a) and the mass of the ABS resin described in (b). It is most preferable that the amount of addition of the ABS resin described in (b) is in the range of 1 to 50% by mass for restoring the quality of the waste material and from the view point of effective use of the resources and from the economical point of view.

Preferably, the impact resistance is measured by the method known in the art when the resins are blended in the invention, and an ABS resin having a higher grade of the impact resistance than the impact resistance of the virgin resin is added based on the measured value, in order to improve the quality of the waste material to the quality of the virgin resin. Examples of such addition method include a first method comprising the steps of measuring the quality of the waste material by a method known in the art, selecting the kind or amount of addition of the ABS resin in a desired grade different from the grade of the waste material based on the measured value, and adding the selected ABS resin having a different grade from the grade of the selected waste material to the selected waste material; a second method comprising the steps of adding with mixing the ABS resin having a different grade from the waste material to the waste material until the waste material restores the same level of the quality as the quality of the virgin resin, and repeating the measurement of the quality of the mixed resin while the ABS resin having a different grade from the waste material is added little by little; and a third method comprising the step of adding the ABS resin having a different grade from the waste material to the waste material without measuring the quality of the waste material. The third method if preferable in the invention when the quality of the waste material is uniform, since the ABS resin can be promptly added to render the method to be economically advantageous. It is preferable to use the ABS/recovery PET alloy together with the virgin resin when the waste material is recycled using the third addition method described above. The resin may be directly blended with a pulverized waste material, or blended by mixing with melting.

The impact resistance of the mixture can be improved, if desired, by blending the ABS resin in a different grade from the waste material with the waste material containing the ABS resin, and the waste material can be recycled as an ABS resin having a grade of a commonly used ABS resin or higher. Since the method is applicable when the used ABS resin is recycled twice or more, the method is able to contribute to sustained development of the society from the view point of effective recycling of the resources and reduction of wastes.

The content of the ABS resin in the total amount of the alloy is usually in the rang of 1 to 80% by mass, preferably in the rang of 5 to 70% by mass, and more preferably in the rang of 10 to 60% by mass in the invention.

Any recovery PET may be used so long as it contains the polyethylene terephthalate resin and recovered after the use. Examples of recovery PET include a PET pellet, PET bottle, PET film, PET fiber and the like. When recovery PET is PET bottles, the kind of the liquid filled in the bottle (for example juice, mineral water and soy bean sauce of various kinds) and the volume of the bottle (for example 150 mL, 250 mL, 500 mL, 1 L, 2 L and the like) are not particularly restricted. While any method of recoveries known in the art such as recovery of single kind of articles or mixed kinds of articles are available, recovery of single kind of articles is preferable among these methods for obtaining recovery articles of high grade. Recovery sources are general household, shops such as super markets and convenience stores, eating establishment such as restaurants, noodle shops and the like, leisure facilities such as amusement parks, seaside resorts and the like, factories, offices buildings, and public facilities such as platform, parks and the like. Preferably, in the invention, the inside of the recovery PET bottle is washed with water, or labels are peeled off from the bottle.

While recovery PET from the recovery source by the method of recovery as described above may be temporarily stored, recovery PET is preferably stored indoor for preventing contamination from open air for temporary storage in the invention. Recovery PET is preferably selected and classified as an intermediate treatment in the invention. While it is more preferable to treat uniform recovery PET in an exclusive use line in the intermediate treatment of recovery PET, a selection line shared with other recycling articles may be used, or PET in a mixed recycling articles may be selected from other recycling articles.

Labels and caps, dissimilar bottles, foreign articles, severely dirty articles and bottles containing remaining contents are preferably removed in the selection step in the invention. While the selection step includes manual selection in municipalities, the selection method is not particularly restricted.

While recovery PET is classified into A rank (very good level: all the caps are removed, the inside of the bottle is washed with water, contents are not remaining, and the bottle is glossy and clean), B rank (rather good level: most of the caps are removed, contents are remaining in some bottle, and the bottle is a little dirty), and D rank (a level to be improved: most of the caps are not removed, the ingredient is remaining, and the bottle is dirty with foreign substances), the recovery PET is preferable in the order of A, B and D.

Recovery PET is subjected to pulverization, separation, washing, removal of water and drying and re-pellet steps in this order in a recycling factory after the selection step. Methods known in the art may be used for these recycling steps.

Recovery PET formed into re-pellets after removal of water and drying in the recycling factory is preferably used as a material of the ABS/recovery PET.

An appropriate amount of virgin PET may be blended with recovery PET. Any commercially available virgin PET may be used for this purpose.

According to the invention, the ABS/recovery PET alloy can be produced from the ABS resin and recovery PET. An example of the production method is a blend method, and examples of the method include (a) a method for producing the alloy by dissolving the ABS resin and recovery PET in a solvent for mixing the resins, followed by removing the solvent, or (b) a method for producing the alloy by kneading with heating the ABS resin and recovery PET followed by cooling. The solvent used in method (a) is the same as described above, and the heating temperature in method (b) is usually above the melting point of the ABS resin or recovery PET.

The content of recovery PET in the total amount of the alloy is usually 5 to 80% by mass, preferably 10 to 60% by mass. Characteristics of the resin becomes good when the proportion of recovery PET is in the range described above, and the alloy can be recycled as a shell material for recording media having a high recycling effect (the amount of recycled PET and recycling ratio).

Other additives such as other resins, a compatibilizer, plasticizer, antioxidant, UV absorbing agent (including a light stabilizer), fire retardant, lubricants heat stabilizer, stabilizing aid, antistatic agent, coloring agent, pigment, antibiotics, fillers (for example carbon or glass), antifungal agent, foaming agent, cloudiness preventing agent, impact resistance improving (or reforming) agent and crystallization nucleating agent may be blended, at the blending step.

While examples of other resins include polybutylene terephthalate (PBT), polycarbonate (PC), polyvinyl chloride (PVC), polypropylene (PP), polyethylene (PE), polymethyl methacrylate (PMMA), nylon, polysulfone (PSF), polyphenylene oxide (PPO), polyphenylene ether (PPE), rubbers, liquid crystal polymers (LCP), polystyrene (PS), polyurethane (PU), polyamide (PA), polyacetal (POM), polyallylate (PAR), Teflon (trade name) and the like, Among them of polybutylene terephthalate (PBT), polycarbonate (PC), polyvinyl chloride (PVC), polypropylene (PP), polyethylene (PE), polymethyl methacrylate (PMMA), nylon, polysulfone (PSF) and polyphenylene oxide (PPO) are preferable in view of compatibility and dispersability. The content of "other resins" in the ABS/recovery PET alloy is preferably 50% by mass or less, more preferably 30% by mass or less, considering the resin characteristics of the alloy obtained and recycling of recovery PET.

Examples of the compatibilizer include polyalkyl methacrylate, polyalkyl acrylate, polyalkyleneglycol, polyalkylene (meth)acrylate, polyalkylene mono (meth)acrylate, polyalkyleneglycol di(meth)acrylate, allylether copolymer, polyvinyl alcohol, modified rubber, graft copolymers between polyolefin and vinyl polymers, dendrimer, acrylonitrile-styrene copolymer (AS) resin having a polycarbonate resin as a main chain, graft copolymer having a polystyrene (PS) as a side chain, graft and/or block copolymer between these resins and at least one of the polymer selected from polyethylene, polypropylene, polyisoprene, polybutadiene and polystyrene, and ionomer compounds.

Examples of the plasticizer include aliphatic dibasic acid ester, chlorinated paraffin, polyester plasticizers, epoxy plasticizers, phosphate ester plasticizers, trimellitic acid ester plasticizers, phthalic acid ester, pyromelitic acid ester, biphenyl tetracarboxylic acid ester, antistatic plasticizer and the like.

Examples of the antioxidant include phenolic antioxidants, sulfur antioxidant, phosphorous antioxidant and the like.

Examples of the light stabilizer (UV absorbing agent) include benzotriazole UV absorbing agents, benzophenone UV absorbing agents, salycilate UV absorbing agents, cyanoacrylate UV absorbing agents, oxanilide UV absorbing agents, hindered amine light stabilizers, Ni light stabilizers, benzoate light stabilizers and the like.

Examples of fire retardant include chlorine fire retardants, bromine fire retardants, phosphorous fire retardants, inorganic fire retardants and the like.

Examples of the lubricant include hydrocarbon lubricants, aliphatic acid lubricants, aliphatic alcohol lubricants, aliphatic amide lubricants, metal soap lubricants and the like.

Examples of the heat stabilizer include metal soap stabilizers, organic tin stabilizers, lead stabilizers and the like.

Examples of the stabilizing aid include phosphite compounds, epoxy compounds, β-diketone compounds, polyol compounds, hydrotalcite compounds and the like.

Examples of the antistatic agent include anionic surfactants, cationic surfactant, nonionic surfactants, amphoteric surfactants, conductive paints, plating, conductive flakes, carbon black, conductive fillers, conductive polymers hydrophilic polymers and the like.

According to the invention, the shell material for recording media can be produced using the ABS/recovery PET alloy. Methods known in the art such as injection molding, extrusion, blow-in molding, compression molding, rotary molding, vacuum molding and cold processing (for example punch processing and bend processing) may be used for the production method.

The shell material for recording media may comprise an window part. In the invention, the window part preferably comprises the polyacrylonitrile-styrene copolymer (AS) resin as the constituting material. Such AS resin may be either a virain material or waste material, or may be a recycled resin prepared by recycling of waste materials. The shell material for recording media having the window part as described above may be produced by integration molding between the shell material except the window part and the window part. Examples of integration molding include two-color molding, ultrasonic wave welding, bonding with an adhesive and the like. The shell material preferably comprises the window part at the upper part of the shell material, when the shell material has the window part in the invention. The window part is most preferably transparent to an extent capable of confirming driving (running) of recording media (such a tape).

When the ABS recovery PET alloy for forming the upper and lower parts of the shell material and the AS resin for the window part is integrated by two-color molding, the molding temperature of the AS resin is usually in the rang of 220 to 300° C., preferably in the rang of 240 to 280° C. While the molding temperature of the ABS/recovery PET alloy may be appropriately selected, the temperature is about 5° C., preferably about 10 to 50° C., as higher as the molding temperature of the AS resin as compared with the molding temperature of the usually used ABS resin or AS resin.

The shell material for recording media are used for various recording media. Such recording media include the shell materials or mechanical parts of recording media products such as video cassettes, disk cartridges or the like. While examples of them include 8 mm video cassettes, DVM (digital video tape) cassettes, professional use video cassettes (for example β-cum and D2), DAT (digital audio tape) cassettes, MC (music cassette tape) cassettes, VHS video cassettes, beta video cassettes, MD (mini-disk) and the like, preferable examples among of the recording media include 8 mm video cassettes, DVM (digital video tape) cassettes, professional use video cassettes(for example β-cum and D2) and DAT (digital audio tape) cassettes. These recording media may be used by being mounted on electric and electronic appliances. Effective use of recovery PET is possible in the invention by using the ABS/recovery PET alloy for casing of these recording media, while the shell material for recording media excellent in heat resistance as compared with currently available products (mainly the ABS resin) can be produced.

While the invention is described in detail with reference to examples, the invention is by no means restricted to these examples.

The alloys (1) to (5) between recovery PET and ABS resin having the following compositions and ABS resin were used in the invention for molding the shell material for recording media using an injection molding machine (cylinder temperature: 260° C.). The window part at the upper part of the shell material was produced by two-color molding of the AS resin and ABS/recovery PET alloy. The product of the invention was also compared with the currently available product ((6) and (7): the shell part is made of the ABS resin, and the window part is made of the AS resin, molding temperature: 235° C.).

[Alloy Composition]

(1) ABS resin/PET recovered from market (A rank)=97/3 (mass/mass)

(2) ABS resin/PET recovered from market (A rank)=90/10 (mass/mass)

(3) ABS resin/PET recovered from market (A rank)=80/20 (mass/mass)

(4) ABS resin/PET recovered from market (A rank)=70/30 (mass/mass)

(5) ABS resin/PET recovered from market (A rank)=20/80 (mass/mass)

(6) ABS resin (general use type)

(7) ABS resin (high rigidity type)

The result of the fall-down test, flatness, dimensional accuracy after molding, dimensional accuracy after heating, and welding strength between the window part of the shell material for recording media and the shell were evaluated with respect to the shell material for recording media molded using the resin samples above. The results were shown in FIG. 1 below.

In the fall-down test, the sell material was dropped from a height of 2 m onto a concrete plane, and the presence of breakage such as cracks was observed by the naked eye. The absence of breakage was evaluated as "OK", and the presence of any breakage was evaluated as "NG".

In the evaluation to flatness of the surface of the sell, if any, was observed by the naked eye. The sell material was evaluated as "OK" when no roughness was observed, while it was evaluated as "NG" when roughness was observed.

In the evaluation of the dimensional accuracy, the size of the shell material after molding was measured whether the dimension exceeds ±1% of the dimension of the mold or not. The molded shell material was evaluated as "NG" or "out of specification" when the margin exceeds ±1% of the size of the mold, while was evaluated as "OK" when not exceeded.

For the evaluation of the dimensional change of the shell material after heating, the shell material after molding was heated at 75° C. for 2 hours, and the size of the shell material was measured after allowing to cool to room temperature whether the dimension exceeds in the range of ±2% of the dimension of the mold. A change of the size exceeding ±1% of the dimension of the mold was evaluated as excellent (⊙), a change of the size exceeding ±1% and not exceeding ±2% of the dimension of the mold was evaluated as good (○), and a change of exceeding ±2% was evaluated as poor (×).

For evaluating the welding strength of the window part, peeling of the window part potion without breakage of the window part itself was tested by applying a force of 10 kg/cm$^2$ to the window part. The welding strength was evaluated as "NG" or "fall-down of window part" when the window part was peeled off, while the welding strength was evaluated as "OK" when the window part was not peeled off.

The second embodiment will be described in detail. The shell material for recording media according to the second embodiment of the invention comprises an window part made of a polyethylene terephthalate resin, polycarbonate resin or polyphenylene ether resin as the constituting material.

Since the constituting material of the shell material of recording media in the second embodiment is the same as that in the first embodiment, descriptions thereof is omitted for avoiding repetition.

The invention provides a shell material for recording media comprising an ABS/recovery PET alloy having an window part. The content of recovery PET in the total amount of the alloy is in the range of 5 to 80% by mass, and the window part comprises a polyethylene terephthalate resin, polycarbonate resin or polyphenylene ether resin as a constituting material. The proportion of the window part in the total amount of the shell material is preferably in the range of 1 to 80% by mass.

While the window part used in the invention comprises the polyethylene terephthalate (PET) resin, polycarbonate (PC) resin or polyphenylene ether (PPE) resin, the polyethylene terephthalate resin is preferably used as the constituting material among the resins above. Such resin may be commercially available virgin materials, waste materials, or recycled materials obtained by recycling of the waste materials. The window part is preferably transparent in the invention. When the window part is composed of the polyethylene terephthalate resin in the invention, the polyethylene terephthalate resin is preferably recovered from markets, and such recovery articles from the market may be recovery PET as described above.

The PC resin is preferably transparent. Any grade of the PC resin is acceptable. Such PC resins are appropriately selected from commercially available PC resins of various grades considering, for example, the uses for electric and electronic appliances, mechanical uses, medical and health care uses and miscellaneous uses, and moldability into sheets, films and compounds. The PC resin can be produced by a method known in the art such as a solvent method (a solvent method, phosgene method or the like) or welding method (a melt method ester exchange method or the like).

The PPE resin is preferably transparent. Any grade of the PPE resin is acceptable. Such PPE resins are appropriately selected from commercially available PPE resins of various grades considering, for example, various uses for home electric appliances, power distribution, automobiles, office devices, copy machines, water supply and drainage facilities and precision equipment, and heat resistance, fire retarding property, hydrothermal resistance, impact resistance, electric characteristics, size stability and chemical resistance. The PPE resin can be produced by a method known in the art such as polymerization of 2,6-xylenol.

The shell material for recording media can be produced using the ABS/recovery PET alloy, and the polyethylene terephthalate resin, polycarbonate resin or polyphenylene resin. While examples of the production method include an injection molding method, extrudion a blow-in molding method, a compression molding method, a rotary molding method, a vacuum molding method and cold processing method (such as punch processing and bend processing), the shell material for recording media having an window part is usually produced by integrally molding the shell material except the window part with the window part. Examples of such integral molding include a two-color molding, ultrasonic welding or bonding with an adhesive. The shell material of the invention preferably has the window part at the upper part, and the window part is preferably transparent for confirming that the recording media (such as a tape) is driven (running). The shell material is preferably produced by two-color molding of the ABS/recovery PET alloy, polycarbonate resin or polyphenylene ether resin.

When the ABS/recovery PET alloy is molded by two-color molding with the polyethylene terephthalate resin, polycarbonate resin or polyphenylene ether resin, the molding temperature of the polyethylene terephthalate resin, polycarbonate resin or polyphenylene ether resin is usually in the rang of 200 to 350° C., preferably in the rang of 220 to 300° C., and more preferably in the rang of 240 to 280° C. While the molding temperature of the ABS/recovery alloy is appropriately determined depending on the content of PET, the temperature is usually 5° C., preferably in the rang of 10 to 50° C. higher than the molding temperature of the polyethylene terephthalate resin, polycarbonate resin or polyphenylene ether resin, in contrast to the molding temperatures of commonly used ABS resins, polyethylene terephthalate resins, polycarbonate resins or polyphenylene ether resins themselves.

While the second embodiment will be described in detail hereinafter, the invention is by no means restricted to these examples.

The ABS/recovery PET alloys having the following compositions (1 to 18) were used in this example, and the shell material for recording media was molded using an injection molding machine (cylinder temperature: 260° C.). The shell material having an window part at the upper part was produced by two-color molding of the ABS/recovery PET alloy with the polyethylene terephthalate (PET) resin, polycarbonate (PC) resin or polyphenylene ether (PPE) resin.

The shell material of the invention was also compared with a currently available product (19: a shell part comprising the ABS resin and an window part comprising the AS resin, molding temperature: 235° C.).

[Composition of Alloy]
1. shell main body: ABS resin/recovery PET (rank A)=97/3 (mass/mass)+window part: transparent PET resin
2. shell main body: ABS resin/recovery PET (rank A)=90/10 (mass/mass)+window part: transparent PET resin
3. shell main body: ABS resin/recovery PET (rank A)=80/20 (mass/mass)+window part: transparent PET resin
4. shell main body: ABS resin/recovery PET (rank A)=70/30 (mass/mass)+window part: transparent PET resin
5. shell main body: ABS resin/recovery PET (rank A)=20/80 (mass/mass)+window part: transparent PET resin
6. shell main body: ABS resin/recovery PET (rank A)=10/90 (mass/mass)+window part: transparent PET resin
7. shell main body: ABS resin/recovery PET (rank A)=97/3 (mass/mass)+window part: transparent PC resin
8. shell main body: ABS resin/recovery PET (rank A)=90/10 (mass/mass)+window part: transparent PC resin
9. shell main body: ABS resin/recovery PET (rank A)=80/20 (mass/mass)+window part: transparent PC resin
10. shell main body: ABS resin/recovery PET (rank A)=70/30 (mass/mass)+window part: transparent PC resin
11. shell main body: ABS resin/recovery PET (rank A)=20/80 (mass/mass)+window part: transparent PC resin
12. shell main body: ABS resin/recovery PET (rank A)=10/90 (mass/mass)+window part: transparent PC resin
13. shell main body: ABS resin/recovery PET (rank A)=97/3 (mass/mass)+window part: transparent PPE resin
14. shell main body: ABS resin/recovery PET (rank A)=90/10 (mass/mass)+window part: transparent PPE resin
15. shell main body: ABS resin/recovery PET (rank A)=80/20 (mass/mass)+window part: transparent PPE resin
16. shell main body: ABS resin/recovery PET (rank A)=70/30 (mass/mass)+window part: transparent PPE resin
17. shell main body: ABS resin/recovery PET (rank A)=20/80 (mass/mass)+window part: transparent PPE resin
18. shell main body: ABS resin/recovery PET (rank A)=10/90 (mass/mass)+window part: transparent PPE resin
19. ABS resin (high rigidity type)

The result of the fall-down test, flatness, dimensional accuracy after molding, dimensional accuracy after heating, and welding strength between the window part of the shell material for recording media and the shell were evaluated with respect to the shell material for recording media molded using the resin samples above. The results were shown in FIG. 2 below.

In the fall-down test, the shell material was dropped from a height of 2 m, and the presence of breakage such as cracks was observed by the naked eye. The absence of breakage was evaluated as "OK", and the presence of any breakage was evaluated as "NG".

In the evaluation of flatness, the surface roughness of the shell was observed by the naked eye. The shell material was evaluated as "OK" when no roughness was observed, while it was evaluated as "NG" when roughness was observed.

In the evaluation of the dimensional accuracy, the size of the shell material after molding was measured whether the dimension exceeds ±1% of the dimension of the mold or not. The molded shell material was evaluated as "NG" when the margin exceeds ±1% of the size of the mold, while was evaluated as "OK" when not exceeded.

For the evaluation of the dimensional change of the shell material after heating, the shell material after molding was heated at 75° C. for 2 hours, and the size of the shell material was measured after allowing to cool to room temperature whether the dimension exceeds ±1% of the dimension of the mold. A change of the size exceeding ±2% of the dimension of the mold is evaluated as poor "×", a change of the size exceeding ±1% and not exceeding ±2% of the dimension of the mold is evaluated as good (◯), and a change of not exceeding ±1% is evaluated as excellent (◎).

For evaluating the welding strength of the window part, peeling of the window part potion without breakage of the window part itself was tested by applying a force of 10 kg/cm$^2$ to the window part. The welding strength was evaluated as "NG" when the window part was peeled off, while the welding strength was evaluated as "OK" when the window part was not peeled off.

The invention enables used ABS resins that have been discarded as wastes due to decrease of quality by recycling to be reclaimed as ABS resins with improved quality. Since the invention provides an effective recycling technology of the used ABS resin, the invention contributes to maintenance of global environment through effective use of resources and reduction of the amount of issue of wastes.

The invention provides a shell material for recording media as a novel application field of the ABS resin/recovery PET alloy.

What is claimed is:

1. A recording media casing made of a material comprising an alloy including an acrylonitrile-butadiene-styrene resin and recovery polyethylene terephthalate, the content of recovery polyethylene terephthalate in the total amount of the alloy being in the range of 5 to 80% by mass; wherein content of said acrylonitrile-butadiene-styrene resin in the total amount of the acrylonitrile-butadiene-styrene resin and the recovery polyethylene terephthalate being in the range of 20 to 70% by mass.

2. The casing according to claim 1, wherein the content of recovery polyethylene terephthalate in the total amount of the alloy being in the range of 10 to 60% by mass.

3. The casing according to claim 1 further comprising a window part.

4. The casing according to claim 3, the window part comprising a polyacrylonitrile-styrene copolymer resin as a constituting material.

5. The casing according to claim 1, the combined content of the acrylonitrile-butadiene-styrene resin and the recovery polyethylene terephthalate in the total amount of the casing material being in the range of 5 to 98% by mass.

6. The casing according to claim 1, the combined content of the acrylonitrile-butadiene-styrene resin and the recovery polyethylene terephthalate being in the range of 10 to 90% by mass in the total amount of the casing material.

7. The casing according to claim 4, the casing material being a two-color molding article of the alloy between the acrylonitrile-butadiene-styrene resin and recovery polyethylene terephthalate and a polyacrylonitrile-styrene copolymer resin.

8. A method for producing a material for recording media casing comprising the step of kneading with healing an alloy between an acrylonitrile-butadiene-styrene resin and recovery polyethylene terephthalate containing 5 to 80% by mass of recovery polyethylene terephthalate; wherein content of said acrylonitrile-butadiene-styrene resin in the total amount of the acrylonitrile-butadiene-styrene resin and the recovery polyethylene terephthalate being in the range of 20 to 70% by mass.

9. A method for producing a material for recording media casing comprising the step of two-color molding of (i) the alloy between the acrylonitrile-butadiene-styrene resin and recovery polyethylene terephthalate containing 5 to 80% by mass of recovery polyethylene terephthalate and (ii) a polyacrylonitrile-styrene copolymer resin; wherein content of said acrylonitrile-butadiene-styrene resin in the total amount of the acrylonitrile-butadiene-styrene resin and the recovery polyethylene terephthalate is in the range of 20 to 70% by mass.

10. A method for recycling recovery polyethylene terephthalate using recovery polyethylene terephthalate for producing an alloy between an acrylonitrile-butadiene-styrene resin and recovery polyethylene terephthalate containing 5 to 80% by mass of recovery polyethylene terephthalate used as a starting material of a material for recording media casing; wherein content of said acrylonitrile-butadiene-styrene resin in the total amount of the acrylonitrile-butadiene-styrene resin and the recovery polyethylene terephthalate is in the range of 20 to 70% by mass.

11. The method for recycling recovery polyethylene terephthalate according to claim 10, the material for recording media casing having an window part, the window part comprising a polyacrylonitrile-styrene copolymer resin as a constituting material.

12. The method for recycling recovery polyethylene terephthalate according to claim 10, the casing material for recording media being a two-color molding article of the alloy between the acrylonitrile-butadiene-styrene resin and recovery polyethylene terephthalate containing 5 to 80% by mass of recovery polyethylene terephthalate and the polyacrylonitrile-styrene copolymer resin.

13. Recording media containing the material for recording media casing according to claim 1.

14. Electronic and electric appliances mounting the recording media according to claim 13.

15. A material for recording media casing comprising an alloy between an acrylonitrile-butadiene-styrene resin and recovery polyethylene terephthalate and having an window part, the content of recovery polyethylene terephthalate in the total amount of the alloy being in the range of 5 to 80% by mass; the content of said acrylonitrile-butadiene-styrene resin in the total amount of the acrylonitrile-butadiene-styrene resin and the recovery polyethylene terephthalate being in the range of 20 to 70% by mass; and the window part comprising the polyethylene terephthalate resin, a polycarbonate resin or a polyphenylene ether resin as a constituting material.

16. The material for recording media casing according to claim 15, wherein the content of recovery polyethylene terephthalate in the total amount of the alloy being in the range of 10 to 60% by mass.

17. The material for recording media casing according to claim 15, wherein the proportion of the window part in the total amount of the material being in the range of 1 to 80% by mass.

18. The material for recording media casing according to claim 15, wherein the window part comprising the polyethylene terephthalate resin as a constituting material.

19. The material for recording media casing according to claim 18, wherein the polyethylene terephthalate resin being a recovery article from a market.

20. The material for recording media casing according to claim 15, wherein the window part being transparent.

21. The material for recording media casing according to claim 15, the material comprising a two-color molding article of the alloy between the acrylonitrile-butadiene-styrene resin and recovery polyethylene terephthalate and the polyethylene terephthalate resin, a polycarbonate resin or a polyphenylene ether resin.

22. A method for producing a material for recording media casing comprising the step of two-color molding of (i) an alloy between the acrylonitrile-butadiene-styrene resin and recovery polyethylene terephthalate and (ii) a polyethylene terephthalate resin, a polycarbonate resin or a polyphenylene ether resin; wherein the content of recovery polyethylene terephthalate in the total amount of the alloy is in the range of 5 to 80% by mass; and content of said acrylonitrile-butadiene-styrene resin in the total amount of the acrylonitrile-butadiene-styrene resin and the recovery polyethylene terephthalate is in the range of 20 to 70% by mass.

23. A method for recycling recovery polyethylene terephthalate using recovery polyethylene terephthalate for producing a material for recording media casing comprising an alloy between an acrylonitrile-butadiene-styrene resin and polyethylene terephthalate and having a window part comprising the polyethylene terephthalate resin, a polycarbonate resin or polyphenylene ether resin as a constituting material; wherein the content of recovery polyethylene terephthalate in the total amount of the alloy is in the range of 5 to 80% by mass; and content of said acrylonitrile-butadiene-styrene resin in the total amount of the acrylonitrile-butadiene-styrene resin and the recovery polyethylene terephthalate is in the range of 20 to 70% by mass.

24. The method for recycling recovery polyethylene terephthalate according to claim 23, wherein the window part comprising the polyethylene terephthalate resin as the constituting material.

25. The method for recycling recovery polyethylene terephthalate according to claim 23, wherein the material for recording media casing being a two-color molding article of (i) the alloy between the acrylonitrile-butadiene-styrene resin and recovery polyethylene terephthalate and (ii) the polyethylene terephthalate resin, polycarbonate resin or polyphenylene ether resin.

26. The method for recycling recovery polyethylene terephthalate according to claim 23, wherein the material for recording media casing being a two-color molding article of (i) the alloy between the acrylonitrile-butadiene-styrene resin and recovery polyethylene terephthalate and (ii) the polyethylene terephthalate resin.

27. Recording media containing the material for recording media casing according to claim 15.

28. Electronic and electric appliances mounting the recording media according to claim 27.

* * * * *